Figure 1:
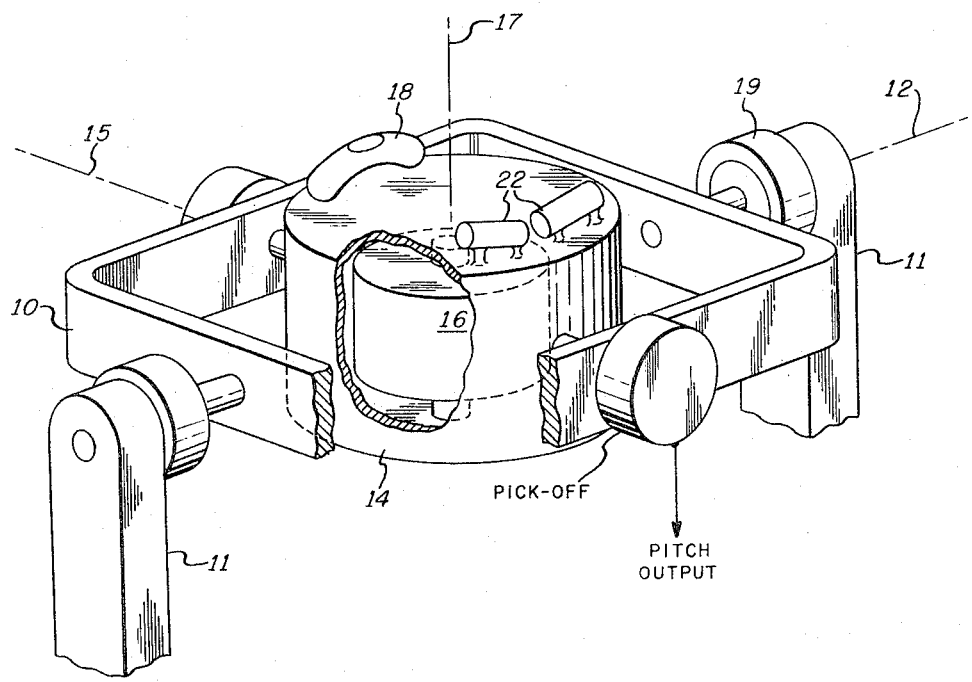

Jan. 31, 1967 T. S. ALLEN ET AL 3,301,074
START-UP GYROSCOPIC COMBINATION FOR GYRO VERTICALS
Filed June 29, 1964 3 Sheets-Sheet 1

INVENTORS
TERRY S. ALLEN
KEITH E. CLOSE
CARL L. LIDIA
EDWIN B. SIRRINE
BY
Arthur H. Serrell
ATTORNEY United States Patent Office 3,301,074
Patented Jan. 31, 1967

3,301,074
START-UP GYROSCOPIC COMBINATION FOR
GYRO VERTICALS
Terry S. Allen, Keith E. Close, and Carl L. Lidia, Phoenix, and Edwin B. Sirrine, Glendale, Ariz., assignors to Sperry Rand Corporation, Great Neck, N.Y., a corporation of Delaware
Filed June 29, 1964, Ser. No. 378,676
11 Claims. (Cl. 74—5.47)

This invention relates to a start-up gyroscopic combination for gyro verticals of the character including a gyroscopic rotor, a motor for spinning the rotor about a normally vertical axis, a normal energy level erecting means and an erecting means operable at an energy level higher than the normal energy level under start-up conditions. The start-up conditioning means of the improved system operates to render the higher level erecting means ineffective and the normal level erecting means effective at a determined speed of the gyroscopic rotor between standstill and normal operating speed. The described erection changeover is effected automatically with the rotor of the combination at a determined speed.

Heretofore, the change in the erection level of operation of the gyro vertical was made at a fixed time interval after start-up where the time selected was based on knowledge of the operational characteristics of the components. An object of the present invention is to provide a system of the character described in which the changeover operation is dependent on an operative condition of the rotor rather than a lapse of time from a start-up point.

One of the features of the present invention is provided by the inclusion of a gating device such as a silicon controlled rectifier in the motor circuit of the system where one of the windings is connected to the anode of the rectifier and another of the windings is connected to the gate of the rectifier.

Another feature of the improved system resides in the monitoring circuit included therein with a silicon controlled rectifier having a gate connected to the anode of the gating device in the motor circuit. Here, the gate of the monitoring circuit is triggered at start-up as the gyroscopic rotor goes through its changeover speed to render the higher level erecting means ineffective and the normal level erecting means effective. The provided monitor is turned off at its gate when the rotor drops below the changeover speed. The system combination includes further independent cut off circuits for the monitoring gate whose respective operations are dependent upon loss of electrical power in the system, failure of electrical components or open conditions in the wiring between the noted electrical components as well as in the components per se.

Figure 2A:
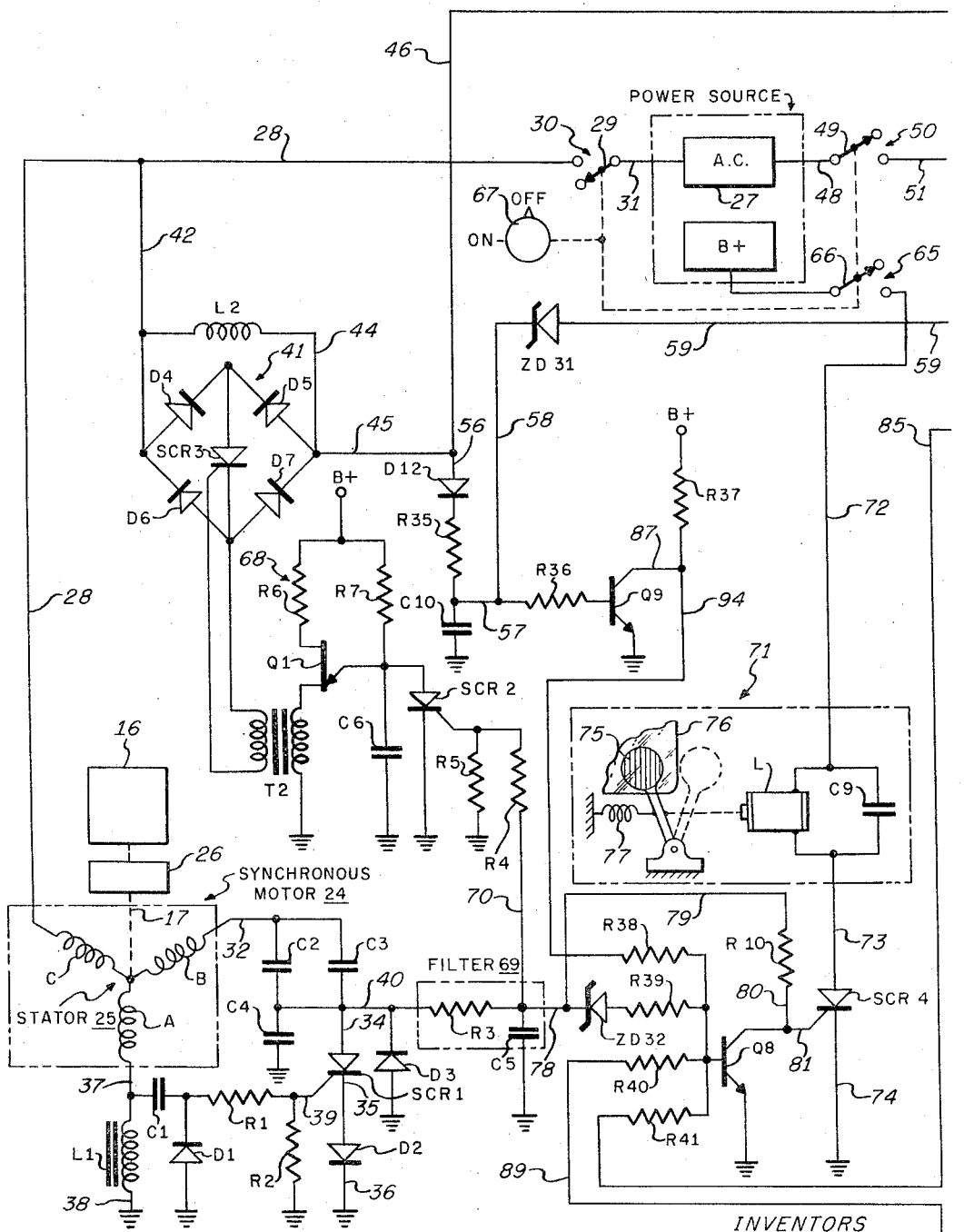
Figure 2B:
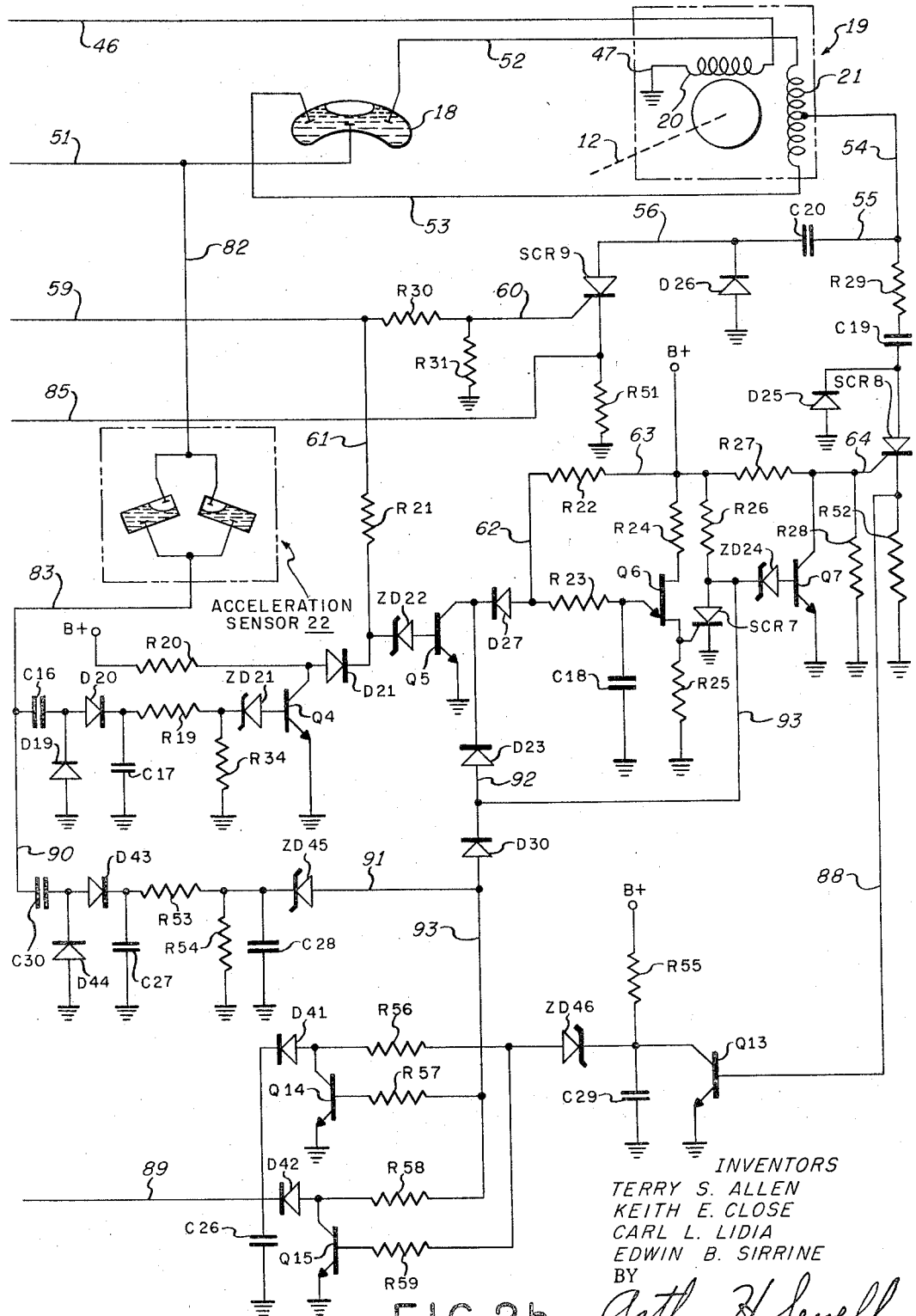

Further features, advantages and details of the improved start-up gyroscopic combination will become apparent in the following description of the subject invention in relation to the accompanying drawings, wherein:

FIG. 1 is a perspective view of a gyro vertical showing the physical arrangement of the electrical components of the improved start-up gyroscopic combination thereon, and FIGS. 2a and 2b provide a composite wiring diagram in which the noted components are connected electrically.

The elements of the representative gyro vertical shown in FIG. 1 include a gimbal 10 mounted on a base 11 with freedom about a normally horizontal axis 12. The rotor frame 14 of the vertical is carried by the gimbal 10 with freedom about a second normally horizontal axis 15 perpendicular to the axis 12. Frame 14 carries a gyroscopic rotor 16 that spins at a fixed speed under normal operations with its axis 17 erected to a suitably determined vertical.

To avoid unnecessary duplication of circuitry and structure, the erecting means provided for the axis 15 of the gyro vertical is included in the drawing and the erecting means for the axis 12 is omitted. The erecting means shown includes a gravitational reference such as a liquid level device 18 that provides an output depending on tilt of the frame 14 from a level condition about axis 15. As shown in FIG. 1, the level 18 is suitably mounted on the rotor frame 14. Another component of the described means is provided by a torque motor 19 whose stator fixed to the base 10 includes a fixed field winding 20 and a control field winding 21. The rotor of the torque motor 19 is fixed to the trunnion of ring 10. The amplitude and sense of the torque exerted about axis 12 by motor 19 is dependent on the magnitude and sense of the output of the gravitational reference 18, the erecting means operating to precess the frame 14 about axis 15 so that as the axis 17 becomes vertical the output of the level 18 goes to null.

Further structure is provided in FIG. 1 to cut off the erecting means so that the rotor 16 is not erected to a false vertical when the level 18 is affected by acceleration influences above a determined level. The cut off acceleration sensor of the combination is provided by a pair of tilted liquid levels indicated at 22 that are suitably mounted on frame 14 to respond to acceleration along axis 12.

Another essential component of the combination is provided by a rotor spinning means shown in the drawing as an electric motor 24 of the synchronous type. Motor 24 operates to bring the rotor 16 up to a normal operating speed from standstill with current characteristics that are inversely proportional to speed. The motor shown in FIG. 2a includes a three-phase stator 25 that is fixed to the frame 14 and a hysteresis rotor ring 26 that usually forms an integral part of the gyroscopic rotor 16. The motor 24 is operated by power from a single phase alternating current source 27 to winding C with the field of the rotor 26 locking with the rotating field of the stator 25 at synchronous speed which corresponds to the normal operating speed of the gyroscopic rotor 16. As shown, source 27 is connected to the winding C of stator 25 by way of lead 28, a blade 29 of a switch 30 when closed, and a lead 31.

Winding B of the stator 25 is connected to ground through parallel circuits, one branch of which includes a capacitance value for the normally operating motor and the other branch of which includes a capacitance value for the motor operating in an initial start-up step from standstill and a gating device indicated as a silicon controlled rectifier S.C.R. 1. The gate of the S.C.R. 1 is triggered over the duration of the start-up period and is turned off when the rotor 16 reaches a determined speed below normal speed. In the concluding phase of the start-up step, the motor operates with the capacitance value provided in the noted one branch included therein which is different from the capacitance value of the other branch. Before the S.C.R. 1 is turned off, the circuit closed in the initial start-up step between winding B and ground includes lead 32, a circuit with parallel branches having the respective starting capacitors C2 and C3 therein, lead 34 to the anode of S.C.R. 1, lead 35 from the cathode of S.C.R. 1 to the anode of diode D2, and ground lead 36 to the cathode of D2. After the S.C.R. 1 is turned off, the ground circuit is closed in the second of the start-up steps to bring the rotor up to synchronous speed. This circuit as well as to operate the rotor at such speed includes the lead 32, the parallel capacitors C2 and C3 and a capacitor C4 arranged in series in the circuit to ground to thereby provide the necessary phasing adjustment for the motor 24 to perform in a satisfactory manner.

Winding A of the stator 25 is connected to ground by way of lead 37, an inductance L1 and lead 38. The changeover means of the improved system includes a circuit that connects the inductance ground circuit of the motor 24 to the gate of the S.C.R. 1. As shown, this circuit includes capacitor C1, diode D1 to ground, resistor R1, and resistor R2 to ground, with one end of the capacitor C1 being connected to the lead 37 and resistance R1 being connected to the gate of the S.C.R. 1 by lead 39. When the start-up conditioning means is rendered effective by the closure of switch 30, the voltage across the inductance L1 triggers the gate of the S.C.R. 1 and the starting capacitance described above is included in the ground winding B motor circuit. As the gyroscopic rotor 16 increases speed from standstill, the current in the ground winding A of the motor decreases sufficiently with the proper selection of the value of resistor R1 to turn off the gate of the S.C.R. 1 at the determined changeover speed. For example at a rotor speed of say 18,500 r.p.m., the current falls to approximately 195 milliamps. The running capacitance combination of capacitors C4 and C2–C3 are now connected in series relation in the ground-winding B motor circuit with the motor continuing to accelerate at a reduced rate until its rotor reaches synchronous speed. The circuit constants are so selected that the changeover speed of the motor of the combination occurs at a determined rotor speed, say 18,500 r.p.m., below its synchronous speed of say 24,000 r.p.m. The provided changeover means includes a diode D3 connecting the anode circuit of the S.C.R. 1 to ground in opposite relation to diode D2. At the changeover speed in the improved system, the voltage at output lead 40 connected to the anode of the S.C.R. 1 changes from a minimal alternating value to a fluctuating positive polarity value whose average level corresponds to the peak level of the alternating current source 27.

In the improved system, the start-up conditioning means includes effective means for erecting the gyroscopic rotor 16 operable at an energy level higher than the normal energy level. The provided changeover means operates at the determined speed of the gyroscopic rotor to render the higher energy erecting means ineffective while simultaneously rendering the normal energy level erecting means effective. During the operating interval of the system between a standstill rotor condition and the changeover speed, the full line voltage of source 27 is applied to both torque motor windings 20 and 21 to bring the rotor 16 to an erected condition quickly. In the improved system, an inductance L2 is included in series with the winding circuits of motor 19 to drop the current therein to its normal value for normal operation of the system when the rotor reaches the changeover speed. To bypass the inductance L2, a silicon controlled rectifier S.C.R. 3 is triggered in a bridge circuit 41 that parallels the inductance L2 and includes the diodes D4, D5, D6, and D7. In the circuit shown in FIGS. 2a and 2b, one side of the inductance L2 and one side of the bridge are connected to the power lead 28 by lead 42. The other side of the inductance L2 and bridge 41 are connected by leads 44, 45 and 46 to one end of the winding 20, with the other end of the winding being connected by lead 47 to ground. The circuitry shown for the control field winding includes lead 48 to the source 27, blade 49 of start-up switch 50, and lead 51 to the gravitational level 18. Leads 52 and 53 connect the respective ends of the control winding 21 to the terminals of the level 18. The ground circuit for the higher energy level erection control includes center tap lead 54, lead 55, capacitor C20, and lead 56 to the anode of silicon controlled rectifier S.C.R. 9. This circuit further includes a diode D26 where cathode is connected to the lead 56 and where anode is connected to ground. The cathode of the S.C.R. 9 is connected to ground by way of resistor R51. At start-up, the S.C.R. 9 is triggered by the triggered S.C.R. 3, the gate of the S.C.R. 9 being connected to bridge lead 45 by way of lead 56, diode D12, resistance R35, lead 57, lead 58, zener diode ZD31, lead 59, resistance R30 and lead 60. Parallel resistance R31 is connected to ground. Bridge lead 45 is also connected to ground through a parallel capacitor C10.

The normal erecting circuit for the control field winding 21 includes the lead 54, resistor R29, capacitor C19, the anode lead of a silicon controlled rectifier S.C.R. 8 and a parallel ground diode D25. The cathode of the S.C.R. 8 is grounded through resistor R52. The S.C.R. 8 is triggered from the bridge lead 45 and connecting lead 59 by way of lead 61, resistance R21, zener diode ZD22 and transistor Q5 whose collector is connected to the gate of S.C.R. 8 by diode D27, lead 62, resistor R22, lead 63, resistor R27 and lead 64. This circuit includes a grounded resistor R28.

The system includes a B+ power source that is connected therein at start-up by a third switch 65 whose blade 66 is arranged in ganged relation to the blades 29 and 49 of switches 30 and 50 for movement with the on-off knob 67. With knob moved to the on condition, the respective switches 30, 50 and 65 are closed and the normal energy level erecting means is rendered ineffective and the higher energy level erecting means is simultaneously rendered effective by triggering the S.C.R. 3 to close the power circuit through the bridge 41 in bypass relation to the inductance L2. The start-up conditioning means of the system effects this result by the B+ energy provided by unijunction relaxation oscillator circuit 68 consisting of resistance R6, capacitor C6, resistance R7 and transistor Q1 whose pulse output is coupled to the gate of the S.C.R. 3 by transformer T2. The described condition is maintained while the rotor is being accelerated by the driving motor 24 from standstill to the changeover speed.

To turn the S.C.R. 3 off at this point in the operation of the system automatically, the conditioning means triggers the gate of a silicon controlled rectifier S.C.R. 2 by the fluctuating output on motor lead 40 to short the capacitor C6 of the oscillator circuit. As shown in FIG. 2a, lead 40 is connected to the gate of S.C.R. 2 by way of the resistance R3 of filter 69, lead 70 and resistance R4. Parallel circuitry to ground is provided at the S.C.R. 2 through resistance R5 and at the filter 69 through capacitor C5. Thus, if for some reason motor speed should drop below threshold speed, fast erection will reoccur and it is therefore necessary to turn the system power knob 67 to the off position to recondition the S.C.R. 2 for further operation. The changeover means included in the improved system operates at a determined speed of the gyroscopic rotor below its normal operating speed to render the higher level energy erecting means ineffective and the normal energy level erecting means effective. The anode of the S.C.R. 1 of the changeover means is connnected to winding B motor circuit. The gate of the S.C.R. 1 of the changeover means is also connected to the winding A motor circuit.

As shown in FIG. 2a the improved system includes a monitoring circuit with a relay 71 and a silicon controlled rectifier S.C.R. 4. Relay 71 includes a paralleled connected inductance L and capacitor C9 that are connected to the B+ switch 65 by way of lead 72. Lead 73 connects the relay 71 to the anode of the S.C.R. 4. The cathode of the S.C.R. 4 is connected to ground by way of lead 74. With the S.C.R. 4 triggered and switch 65 closed, the relay 71 operates with inductance L energized so that its armature moves flag 75 from an observable position at window 76 against the influence of a biasing spring 77 to a hidden position indicated by the dotted position of the flag in the figure. The S.C.R. 4 of the monitoring circuit is triggered at the changeover speed by the fluctuating output of the anode circuit of the S.C.R. 1 by way of lead 40, filter 69, lead 78, lead 79, resistance R10, lead 80, and lead 81. At start-up, the flag 75 of the relay 71 is visible to the operator at window 76 until the changeover speed is reached. At this point, the S.C.R. 4 is triggered and the monitoring circuit is conditioned with inductance L energized and the flag 75 out of view of the operator. In the provided arrangement, should the speed of the rotor drop back to the changeover speed during normal operation for any reason, the S.C.R. 4 of the monitoring circuit is turned off to open the circuit and restore flag 75 to its visible position under the influence of spring 77.

In the quick erection portion of the operation, the ground circuit of the control field winding 21 of motor 19 is closed by triggering the S.C.R. 9 from the gating voltage obtained from the capacitor C10 by way of lead 58, ZD31, lead 59, R30 and lead 60. Under the normal conditions of erection of the rotor, the ground circuit of the control field winding 21 of motor 19 is closed by triggering the S.C.R. 8 from the gating voltage obtained from the capacitor C10 by way of the described circuit to lead 59 and connecting lead 61, resistance R21, ZD22, transistor Q5, diode D27, lead 62, resistance R22, lead 63, resistance R27 and lead 64.

The improved system disables or cuts off the normal erecting control under conditions of accelerations where the acceleration sensor 22 provides an output at a determined acceleration level. The provided circuitry limits the cut off period of the erection means and automatically restores the system to normal operation. As shown, acceleration sensor 22 is connected to power lead 51 by lead 82 and is connected to transistor Q4 by way of lead 83, capacitor C16, diode D20, resistance R19, and zener diode ZD21. A connection to ground is provided between C16 and D20 that includes D19. A connection to ground is provided between D20 and R19 that includes capacitor C17. A connection to ground is provided between R19 and ZD21 that includes resistance R34. The collector of transistor Q4 is connected to B+ by way of resistance R20. Normally the transistor Q4 is cut off and the sensor 22 produces no output.

With an output from the sensor 22, the erecting cut off is effective with transistor Q4 conducting and transistor Q5 cut off. With the silicon controlled rectifier S.C.R. 7 turned off, B+ connected to the base of transistor Q7 by way of resistance R26 and zener diode ZD24 turns the transistor on to connect the gate of the S.C.R. 8 to ground to disable the erecting means. The provided circuitry includes resistance R23 to the diode D27 in the base circuit of transistor Q6 with a timing capacitor C18 connected to ground. The emitter circuit of Q6 is connected to the gate of the S.C.R. 7. Collector lead of the transistor Q6 is connected to B+ through resistance R24. The ground lead for the emitter end of the transistor Q6 includes a resistance R25. With the transistor Q5 cut off, the timing capacitor C18 begins its charging period connected to B+ through resistances R23 and R22. When the firing voltage on the capacitor C18 is reached, the unijunction transistor Q6 conducts to discharge the capacitor and produce a voltage pulse across the resistance R25 that triggers the gate of S.C.R. 7. This shunts the curernt driving the transistor Q7 to ground and restores the S.C.R. 8 to its normal operative condition. Therefore, if the acceleration detector and erection cut-off circuitry is on for more than a predetermined time, say 3 minutes, the normal erection circuits are reestablished, thereby providing a desirable safety feature.

The cathode of S.C.R. 9 is connected to ground by way of resistance R51. Lead 85 connects the control field winding 21 to the gate of the S.C.R. 4 in a turn off circuit that includes resistance R41 and transistor Q8 whose emitter is connected to ground and whose collector is connected to the gate lead 81. A short condition in either S.C.R. 3 or S.C.R. 9 in the described means triggers the transistor Q8 to cut off the S.C.R. 4 by connecting its gate to ground.

Loss of voltage at the fixed field winding 20 due to an open circuit at L2 is detected by the turn off circuit including lead 56 to lead 57, resistance R36, transistor Q9 and the B+ circuit to transistor Q8 including resistance R37, lead 87, lead 94 and resistance R38. Here, the loss of the noted voltage causes Q9 to cut off and trigger transistor Q8 to turn off the S.C.R. 4 and de-energize the relay 71.

Loss of normal erecting currents at control field 21 are detected by the relay 71 where the circuits include a ground circuit for the cathode of S.C.R. 8 including resistance R52, lead 88 to the base of transistor Q13. With an open in the described circuit, Q13 shuts off, and a pulse input is provided from a circuit to the collector of Q13 connected to B+ through resistance and to ground through capacitor C29, a zener diode ZD46, a branch of a parallel line including resistance R56 and diode D41 to common lead 89 and resistor R40 to the transistor Q8. The other branch of the parallel line includes resistor R59, transistor Q15 and diode D42.

To discriminate between cut off of the S.C.R. 8 from operation by the acceleration sensor 22 and an actual failure condition, the sensor 22 is connected to the collector of Q5 and the anode of the S.C.R. 7 by way of lead 90 to lead 83, capacitor C30, diode D43, resistance R53, zener diode ZD45, lead 91 to diode D30, branch lead 92 to the collector by way of diode D23 and branch lead 93 to the S.C.R. 7 anode. Ground diode D44 is included between capacitor C30 and diode D43. Ground capacitor C27 is included between diode D43 and resistance R53. Ground resistance R 54 and ground capacitor C28 are included between resistance R53 and zener diode ZD45. The monitoring circuit further includes lead 93 to lead 91 to the base of transistor Q14 by way of resistance R57 and to the diode D42 by way of resistance R58. The monitoring circuit includes ground capacitor C26 and provides an input to turn transistor Q8 on that makes the necessary discrimination.

A further circuit connects lead 78 to transistor Q8 by way of zener diode ZD32 and resistance R39 to control the monitoring circuit by turning on the Q8 for an over-voltage condition in the winding B circuit of the synchronous motor 24.

While the invention has been described in its preferred embodiments, it is to be understood that the words which have been used are words of description rather than of limitation and that changes within the purview of the appended claims may be made without departing from the true scope and spirit of the invention in its broader aspects.

What is claimed is:

1. A system for erecting a gyroscopic rotor quickly under start-up conditions including a source of electric power; a gyro vertical having a universally mounted rotor frame, a gyroscopic rotor carried by the frame to spin about a normally vertical axis, a polyphase synchronous electric motor having a polyphase wound stator for bringing the rotor up to normal operating speed from standstill; start-up conditioning means including means for connecting the electric motor to the power source, means rendered ineffective under start-up conditions operable at a normal energy level for erecting the rotor, effective means for erecting the rotor operable at an energy level higher than the normal energy level, and changeover means including an S.C.R. with an anode connected to one of the stator windings and a gate connected to another of the stator windings and operable at a determined speed below the normal operating speed of the rotor for rendering the higher energy level erecting means ineffective and the normal energy level erecting means effective.

2. A system of the character claimed in claim 1, including a monitoring circuit with an S.C.R. having a gate, and a triggering circuit connecting the gate of the S.C.R. to the anode of the S.C.R. of the changeover means.

3. A system of the character claimed in claim 2, in which the erecting means includes a torque motor having a fixed field winding, means including a turn off circuit connecting the fixed field winding to the monitoring S.C.R. gate.

4. A system of the character claimed in claim 2, in which the erecting means includes a torque motor having a control field winding, and means including a turn off circuit connecting the control field winding to the monitoring S.C.R. gate.

5. A system of the character claimed in claim 2, including means for sensing acceleration, means responsive to the acceleration sensing means at a determined acceleration level for disabling the erecting means, and means including a turn off circuit connecting the sensing means to the monitoring S.C.R. gate.

6. A start-up gyroscopic combination including an A.C. source, a gyro vertical having a gyroscopic rotor, start-up conditioning means including a synchronous motor for bringing the rotor up to a normal operating speed from standstill having a three phase winding, changeover means dependent on an operational speed of the rotor below normal speed including a circuit connecting one of the motor windings to the source, a circuit with an inductance connecting the second of the motor windings to ground, a parallel circuit having a capacitance branch and an S.C.R. branch connecting the third of the motor windings to ground, and a circuit connecting the gate of the S.C.R. to the inductance circuit for triggering the gate below the changeover rotor speed and for turning the gate off above the changeover rotor speed.

7. A combination of the character claimed in claim 6, including a monitoring circuit with a relay operatively connected to the anode of the S.C.R. gate of the changeover means.

8. A gyroscopic combination including an A.C. source, a gyro vertical having a gyroscopic rotor, a synchronous motor for spinning the rotor at a normal operating speed having a polyphase wound stator with a winding connected to the source, a winding in a circuit to ground including an inductance, a winding in a parallel circuit to ground having a branch with capacitance and a branch with an S.C.R., and means for providing a monitoring output with the rotor at normal operating speed including a circuit connecting the gate of the S.C.R. to the inductance circuit for triggering the S.C.R. under start-up conditions until the rotor reaches a determined speed below normal speed.

9. A combination of the character claimed in claim 8, in which the monitoring output means includes a circuit having an S.C.R. with a gate triggered by the output at speeds of the rotor above the determined speed.

10. A combination of the character claimed in claim 8, in which the monitoring output means includes a circuit having an S.C.R. with a gate triggered by the output at speeds of the rotor above the determined speed, including means for erecting the rotor including a torque motor with windings, means including a turn off circuit connecting the winding to the S.C.R. gate of the monitoring output means, and means including a turn off circuit connecting the other winding to the S.C.R. gate of the monitoring output means.

11. A combination of the character claimed in claim 8, in which the monitoring output means includes a circuit having an S.C.R. with a gate triggered by the output at speeds of the rotor above the determined speed, including means for sensing acceleration, means for erecting the rotor, means responsive to the acceleration sensing means at a determined acceleration level for disabling the erecting means, and means including a turn off circuit connecting the sensing means to the S.C.R. gate of the monitoring output means.

References Cited by the Examiner

UNITED STATES PATENTS 2,297,274   9/1942   Wunsch _____ 74—5.1

FOREIGN PATENTS 855,155   2/1940   France.

FRED C. MATTERN, Jr., *Primary Examiner.*

BROUGHTON G. DURHAM, *Examiner.*

T. W. SHEAR, *Assistant Examiner.*